United States Patent
Gubbi Lakshminarasimha et al.

(10) Patent No.: US 12,462,450 B2
(45) Date of Patent: Nov. 4, 2025

(54) METHODS AND SYSTEM FOR LOW DOSE X RAY COMPUTED TOMOGRAPHY PERFUSION IMAGING

(71) Applicant: Tata Consultancy Services Limited, Mumbai (IN)

(72) Inventors: Jayavardhana Rama Gubbi Lakshminarasimha, Bangalore (IN); Viswanath Pamulakanty Sudarshan, Bangalore (IN); Vartika Sengar, Bangalore (IN); Arpan Pal, Kolkata (IN); Pavan Kumar Reddy Kancham, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 362 days.

(21) Appl. No.: 18/175,484

(22) Filed: Feb. 27, 2023

(65) Prior Publication Data

US 2023/0326101 A1    Oct. 12, 2023

(30) Foreign Application Priority Data

Mar. 28, 2022   (IN) .............................. 202221018042

(51) Int. Cl.
  *G06T 11/00*    (2006.01)
(52) U.S. Cl.
  CPC .......... *G06T 11/006* (2013.01); *G06T 11/005* (2013.01); *G06T 2207/10081* (2013.01)
(58) Field of Classification Search
  CPC ......... G06T 2207/10081; G06T 11/005; G06T 11/006; G06T 2210/41; G06T 2207/10076;

(Continued)

(56) References Cited

U.S. PATENT DOCUMENTS

2021/0158963 A1   5/2021   Menon et al.

FOREIGN PATENT DOCUMENTS

WO   WO-2021179078 A1 *  9/2021 ............. A61B 6/032

OTHER PUBLICATIONS

Fang, Ruogu et al. "Tissue-specific sparse deconvolution for low-dose CT perfusion." International Conference on Medical Image Computing and Computer-Assisted Intervention vol. 16, Pt 1 (2013): 114-21. doi: 10.1007/978-3-642-40811-3_15 (Year: 2013).*

(Continued)

*Primary Examiner* — Matthew C Bella
*Assistant Examiner* — Janice E. Vaz
(74) *Attorney, Agent, or Firm* — Finnegan, Henderson, Farabow, Garrett & Dunner, LLP

(57) ABSTRACT

State of the art mechanisms being used for achieving diagnostic-quality images under low-dose settings for general CT imaging have the disadvantages that CT images are fixed during the optimization process to generate perfusion maps, which can lead to suboptimal CT images with respect to the perfusion maps generated, although they might appear spatially smooth or denoised. The disclosure herein generally relates to Computer Tomography (CT) scanning, and, more particularly, to a method and system for CT image reconstruction. The system performs modelling an optimization problem for joint estimation of a set of structural CT images and a perfusion map, and further solves the optimization problem for the reconstruction of the CT images of a subject.

12 Claims, 8 Drawing Sheets

(58) Field of Classification Search
CPC ... G01N 23/046; G01N 2223/419; A61B 6/03
See application file for complete search history.

(56) References Cited

OTHER PUBLICATIONS

Yuanke Zhang et al., "Contrast-Medium Anisotropy-Aware Tensor Total Variation Model for Robust Cerebral Perfusion CT Reconstruction with Low-Dose Scans Priors," IEEE Transactions on Computational Imaging. Sep. 2020, vol. 6, pp. 1375-1388, Publisher: IEEE https://www.ncbi.nlm.nih.gov/pmc/articles/PMC7731921/pdf/nihms-1632580.pdf.

* cited by examiner

METHODS AND SYSTEM FOR LOW DOSE X RAY COMPUTED TOMOGRAPHY PERFUSION IMAGING

PRIORITY CLAIM

This U.S. patent application claims priority under 35 U.S.C. § 119 to: India application No. 202221018042, filed on Mar. 28, 2022. The entire contents of the aforementioned application are incorporated herein by reference.

TECHNICAL FIELD

This disclosure relates generally to Computer Tomography (CT) scanning, and more particularly to a method and system for low-dose X-ray CT structural and perfusion image reconstruction.

BACKGROUND

Dynamic computed tomography (CT) perfusion is a clinically established imaging method for stroke and subarachnoid hemorrhage. A perfusion imaging session provides spatial cerebral blood flow (CBF) and cerebral blood volume (CBV) maps along with other perfusion parameters such as mean transit time (MTT) and time to peak (TTP). Despite its advantages, a single perfusion scanning session involves multiple CT scans taken in succession and the amount of radiation involved is a cause of concern. Lowering the dose compromises the signal to noise ratio in the reconstructed CT perfusion (CTP) images as well as the functional CBF maps and hinders accurate diagnosis and timely intervention.

The inventors here have recognized several technical problems with such conventional systems, as explained below. Several state-of-the-art mechanisms have focused on achieving diagnostic-quality images under low-dose settings for general CT imaging. However, the typical process to obtain the perfusion maps involves two steps: (i) reconstructing the low-dose CT images, and then (ii) computing the perfusion maps using algorithms like truncated singular value decomposition. That is, the CT images are fixed during the optimization process to generate perfusion maps. This can lead to suboptimal CT images with respect to the perfusion maps generated, although they might appear spatially smooth or denoised.

SUMMARY

Embodiments of the present disclosure present technological improvements as solutions to one or more of the above-mentioned technical problems recognized by the inventors in conventional systems. For example, in one embodiment, a processor implemented method is provided. The method involves acquiring, via one or more hardware processors, a plurality of frames from a low-dose X-ray computerized tomography (CT) perfusion scan of a subject. Further, one or more contrast enhanced frames are identified from among the plurality of frames, via the one or more hardware processors. Further, a plurality of tissue enhancement measurements (C) are obtained from the one or more contrast enhanced frames, via the one or more hardware processors. Further, an optimization problem for joint estimation of a set of structural CT images and a perfusion map is modeled based on the plurality of tissue enhancement measurements (C), via the one or more hardware processors. Further, the optimization problem is solved, via the one or more hardware processors, by determining an average structural prior image (U?) and a functional image (V) with a 3D image-gradient-based prior and another patch-based prior with a fixed patch length, comprising, iteratively performing, a) reconstructing a pre-defined number of frames (M) of a structural image obtained using the 3D image-gradient-based prior and then averaging the M frames to obtain the image U, and b) applying deconvolution term and the patch-based prior information with information from U, to obtain V.

In another aspect, a system is provided. The system includes one or more hardware processors, a communication interface, and a memory comprising a plurality of instructions. The plurality of instruction when executed, cause the one or more hardware processors to acquire a plurality of frames from a low-dose X-ray computerized tomography (CT) perfusion scan of a subject. Further, one or more contrast enhanced frames are identified from among the plurality of frames, via the one or more hardware processors. Further, a plurality of tissue enhancement measurements (C) are obtained from the one or more contrast enhanced frames, via the one or more hardware processors. Further, an optimization problem for joint estimation of a set of structural CT images and a perfusion map is modeled based on the plurality of tissue enhancement measurements (C), via the one or more hardware processors. Further, the optimization problem is solved, via the one or more hardware processors, by determining an average structural prior image (U?) and a functional image (V) with a 3D image-gradient-based prior and another patch-based prior with a fixed patch length, comprising, iteratively performing, a) reconstructing a pre-defined number of frames (M) of a structural image obtained using the 3D image-gradient-based prior and then averaging the M frames to obtain the image U, and b) applying deconvolution term and the patch-based prior information with information from U, to obtain V.

In yet another aspect, a non-transitory computer readable medium is provided. The non-transitory computer readable medium includes a plurality of instructions, which when executed, causes one or more hardware processors to acquire a plurality of frames from a low-dose X-ray computerized tomography (CT) perfusion scan of a subject. Further, one or more contrast enhanced frames are identified from among the plurality of frames, via the one or more hardware processors. Further, a plurality of tissue enhancement measurements (C) are obtained from the one or more contrast enhanced frames, via the one or more hardware processors. Further, an optimization problem for joint estimation of a set of structural CT images and a perfusion map is modeled based on the plurality of tissue enhancement measurements (C), via the one or more hardware processors. Further, the optimization problem is solved, via the one or more hardware processors, by determining an average structural prior image (U?) and a functional image (V) with a 3D image-gradient-based prior and another patch-based prior with a fixed patch length, comprising, iteratively performing, a) reconstructing a pre-defined number of frames (M) of a structural image obtained using the 3D image-gradient-based prior and then averaging the M frames to obtain the image U, and b) applying deconvolution term and the patch-based prior information with information from U, to obtain V.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
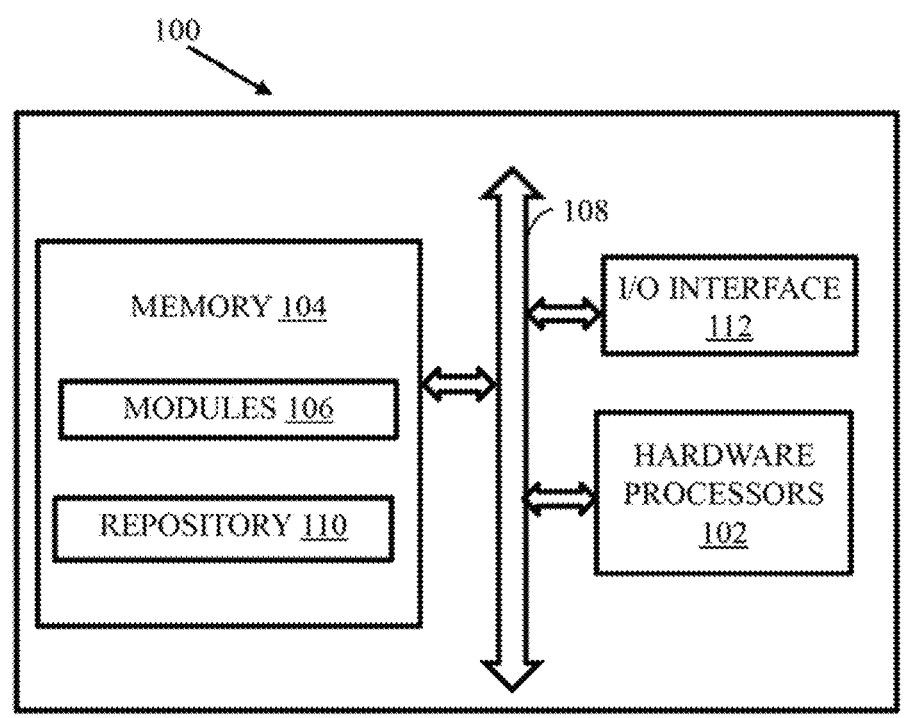
FIG. 1 illustrates an exemplary system for reconstruction of Computer Tomography (CT) images, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Several state-of-the-art mechanisms have focused on achieving diagnostic-quality images under low-dose settings for general CT imaging. However, the typical process to obtain the perfusion maps involves two steps: (i) reconstructing the low-dose CT images, and then (ii) computing the perfusion maps using algorithms like truncated singular value decomposition. That is, the CT images are fixed during the optimization process to generate perfusion maps. This can lead to suboptimal CT images with respect to the perfusion maps generated, although they might appear spatially smooth or denoised. The method and system disclosed in the embodiments herein address this issue by modeling and solving an optimization problem for joint estimation of a set of structural CT images and a perfusion map. Referring now to the drawings, and more particularly to FIG. 1 through FIG. 4D, where similar reference characters denote corresponding features consistently throughout the figures, there are shown preferred embodiments and these embodiments are described in the context of the following exemplary system and/or method.

FIG. 1 illustrates an exemplary system for reconstruction of Computer Tomography (CT) images, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of reconstruction of CT images, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the reconstruction of the CT images.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 2 and FIG. 3, and the example figures in FIGS. 4A through 4C.

Figure 2A:
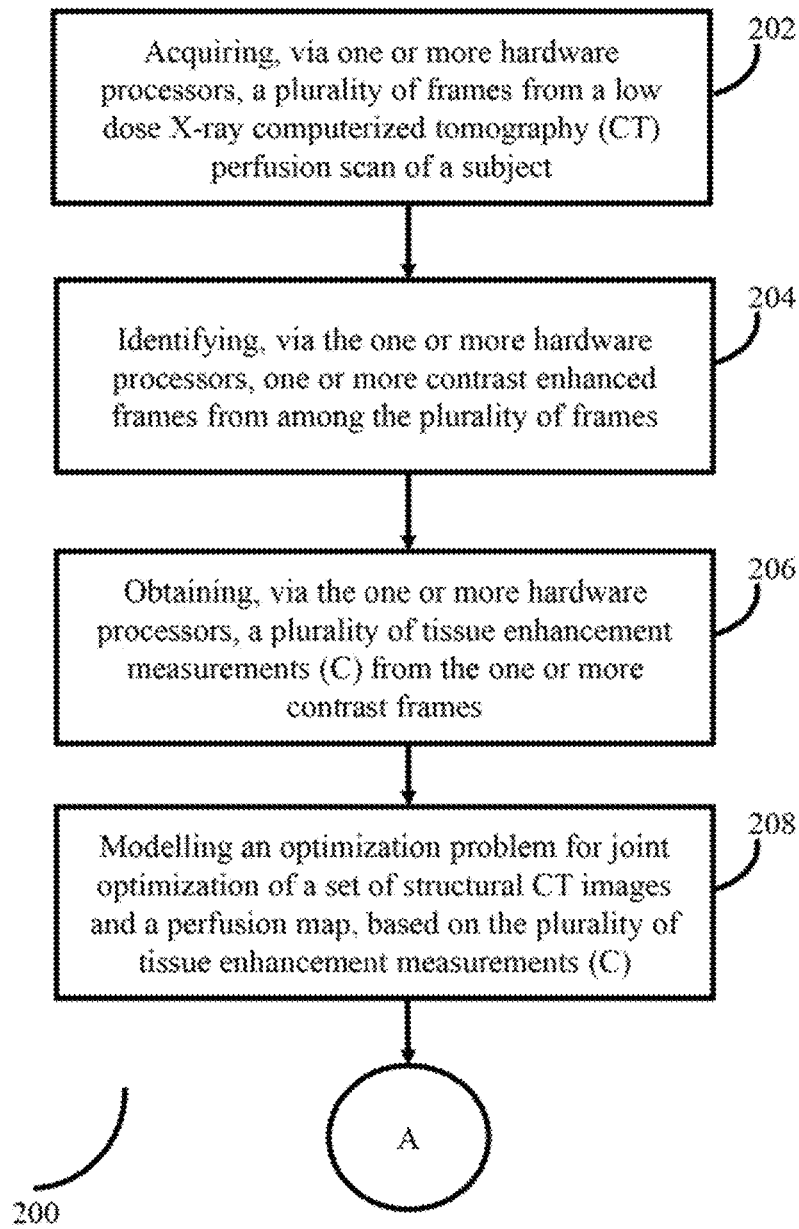
FIGS. 2A and 2B (collectively referred to as FIG. 2) is a flow diagram depicting steps involved in the process of reconstructing the CT images, using the system of FIG. 1, according to some embodiments of the present disclosure.
Figure 2B:
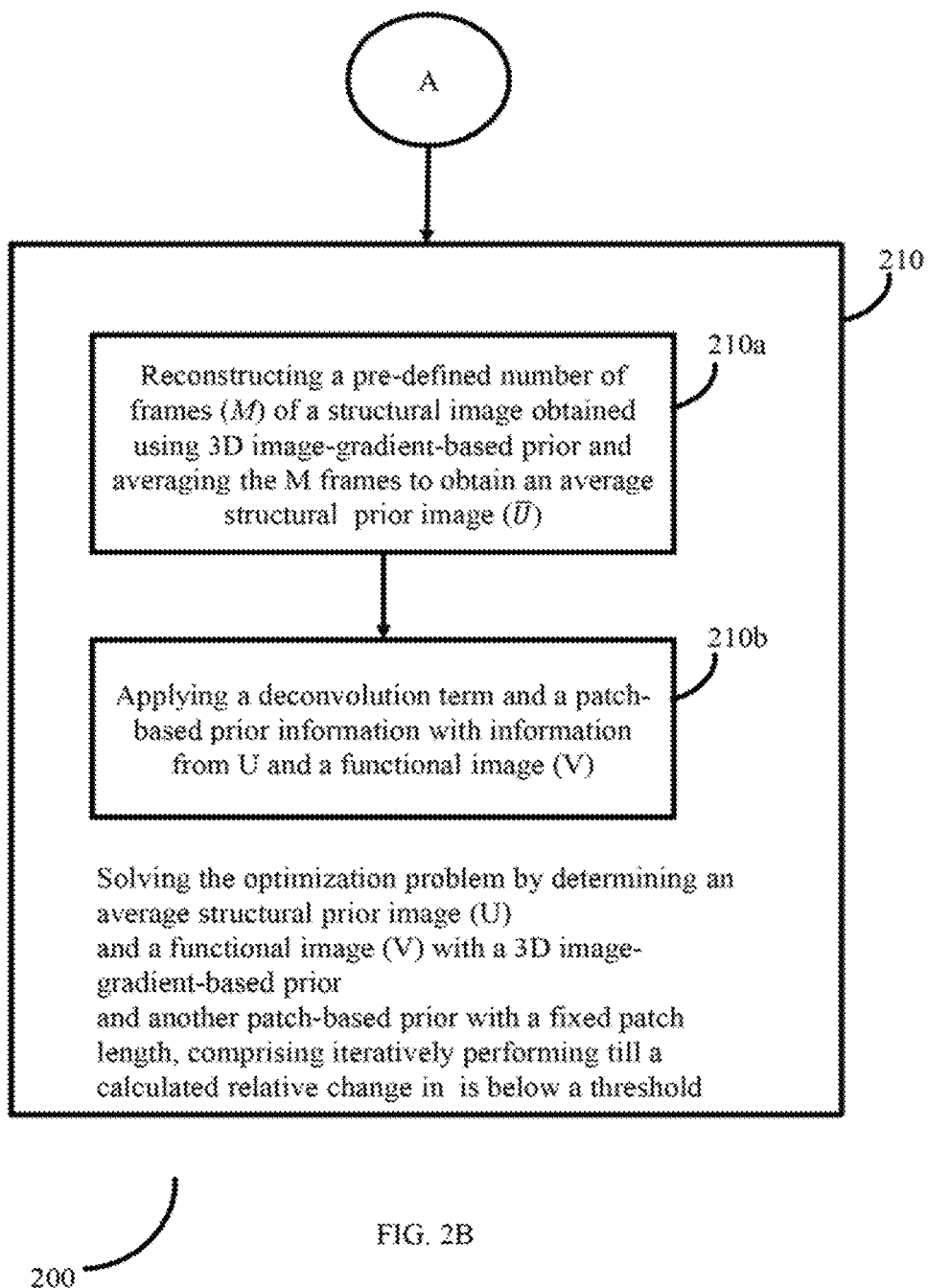

FIGS. 2A and 2B (collectively referred to as FIG. 2) is a flow diagram depicting steps involved in the process of reconstructing the CT images, using the system of FIG. 1, according to some embodiments of the present disclosure.

At step 202 of a method 200 depicted in FIG. 2, the system 100 acquires, via the one or more hardware processors 102, a plurality of frames from a low dose X-ray computerized tomography (CT) perfusion scan of a subject. In this context, 'low dose' refers to the fact that the CT perfusion scan has been done by using a low quantity of radiation. Further, at step 204 of the method 200, the system 100 identifies, via the one or more hardware processors, one or more contrast enhanced frames, from among the plurality of frames. The plurality of frames include contrast enhanced frames as well as non contrast enhanced frames. The system 100 identifies all the contrast enhanced frames and the non contrast enhanced frames, and then the contrast enhanced frames are processed further at step 206. For example, consider that total number of frames is M+T, where M frames are the non contrast enhanced frames, and contain structural data that may be used in construction of a cerebral blood flow (CBF) map. Let $\{U_t\}_{t=1}^T$ represent a set of T dynamic CT images required for computing the CBF map V (also referred to as 'perfusion map'). If $Y_t$ represents measurement corresponding to $t^{th}$ scan, then a forward model implemented by the system for the reconstruction of CT image is represented as $Y_t = \mathcal{R} U_t$, where operator $\mathcal{R}(\cdot)$ represents an imaging system (i.e. hardware) used for the CT imaging and depends on detector arrangements and a system acquisition scheme. For the forward model, tissue enhancement measurements (C) and unknown tissue-residue (R) form column vectors. Then at step 206 of the method 200, the system 100 obtains, via the one or more hardware processors, a plurality of tissue enhancement measurements (C) from the one or more contrast enhanced frames. The plurality of tissue enhancement measurements (C) is obtained from the one or more contrast enhanced frames by using an equation $$C = C_a R \odot \mathcal{D}(V) \quad (1)$$

wherein $C_a$ is a block-circulant construction of an arterial input function (AIF), $\mathcal{D}(\cdot)$ outputs a diagonal matrix with elements of V along its diagonal, V is a perfusion map constructed from the one or more contrast enhanced frames, and $\odot$ represents element-wise product.

Further, at step 208 of the method 200, the system 100 models, via the one or more hardware processors, an optimization problem for joint estimation of a set of structural CT images and a perfusion map, based on the plurality of tissue enhancement measurements (C). The modeled optimization problem is represented as minimizing the objective function in equation (2):

$$\arg\min_{U,V} D_U(U|Y) + D_V(V|C) + \lambda_U \phi_U(U) + \lambda_V \phi_V(V) \quad (2)$$

Where, $D_U(\cdot)$ and $D_V(\cdot)$ represent data fidelity terms corresponding to reconstruction of the structural CT images $$U := ((U_m)_{m=1}^M)$$

and the CBF map V respectively. $\Phi_U(\cdot)$ and $\Psi_V(\cdot)$ represent regularizers for U and V respectively.

Further, at step 210 of the method 200, the system 100 solves, via the one or more hardware processors, the optimization problem by determining an average structural prior image ($\overline{U}$) and a functional image (V) with a 3D image-gradient-based prior and another patch-based prior with a fixed patch length. Determining U and V comprises iteratively performing the following sub-steps. At step 210a, the system 100 reconstructs a pre-defined number of frames (M) of a structural image obtained using the 3D image-gradient-based prior and then averaging the M frames to obtain the image U, and then at step 210b, applies deconvolution term and the patch-based prior information with information from U, to obtain V. These steps are further explained below.

For reconstructing U, the system 100 enforces gradient sparsity along both spatial and temporal directions, and hence, $\Phi(U)$ is defined as:

$$\phi_U(U) = \sum_{m=1}^M TV_x(U_m) + TV_y(U_m) + TV_z(U_m) + TV_t(U_m),$$

where $TV_x(\cdot)$, $TV_y(\cdot)$, $TV_z(\cdot)$, $TV_t(\cdot)$ denote the smoothed total variation (TV) norm which computes the forward finite difference between adjacent pixels along the three spatial directions and the temporal direction.

The system 100 uses an anatomically-weighted gradient-based penalty for reconstructing the CBF map. In this process, the system 100 initially computes an arithmetic mean $\overline{U}$ of the set of structural CT images U. Further, an anatomically different prior is defined as $$\phi_V(V|\overline{U}) = \sum_{i=1}^N \sum_{j \in \mathcal{N}(i)} W_{i,j}(\overline{U})|V^i - V^j| \quad (3)$$

where weights $W_{i,j}$ are obtained based on intensities in $\overline{U}$ as:

$$W_{i,j}(\overline{U}) = \begin{cases} 1 & \text{for } k \text{ nearest neighbours as per } \|\mathcal{P}_i(\overline{U}) - \mathcal{P}_j(\overline{U})\|_2^2 \\ 0 & \text{otherwise} \end{cases} \quad (4)$$

Where, $\mathcal{P}_i$ extracts a patch of suitable size from a given image around the voxel location i and K is a scalar that decides how many voxels in the neighbourhood participate in the penalty function. Hence, the overall objective function for the joint estimation problem is given as:

$$\arg\min_{U,V} \sum_{m}^{M} \|\mathcal{R}U_m - Y_m\|_2^2 + \|C - C_a R \odot \mathcal{D}(V)\|_2^2 + \lambda_U \phi(U) + \lambda_V \Psi(V) \quad (5)$$

The optimization problem in (5) is solved by the system 100 by iteratively alternating between the dynamic set U and the image V using the projected gradient descent. Step size of the gradient descent is adjusted in an adaptive manner such that the reduction in the objective function is ensured. To simplify the complexity of the objective function, the objective function is modified such that while evaluating the prior $\psi(V|U)$, value of U from the previous iteration is used. This design leads to smooth convex problems to solve for V given U and vice versa. Thus, for $(n+1)^{th}$ iteration of updating the variables U, V, the update for V includes (i) computing the arithmetic mean $\bar{U}$ of the set of images $$\{U\}_{m=1}^{M}$$

from $n^{th}$ iteration, (ii) computing the weights Wi,j based on $\bar{U}$, and (iii) computing the gradient and the sum of the prior penalty. The system 100 terminates/stops the iterations when the relative change in V is smaller than a predefined threshold, which may be configured as per implementation requirements. In various embodiments, steps in method 200 may be performed in the same order as depicted or in any alternate order that is technically feasible. In another embodiment, one or more steps in method 200 may be omitted.

Figure 3:
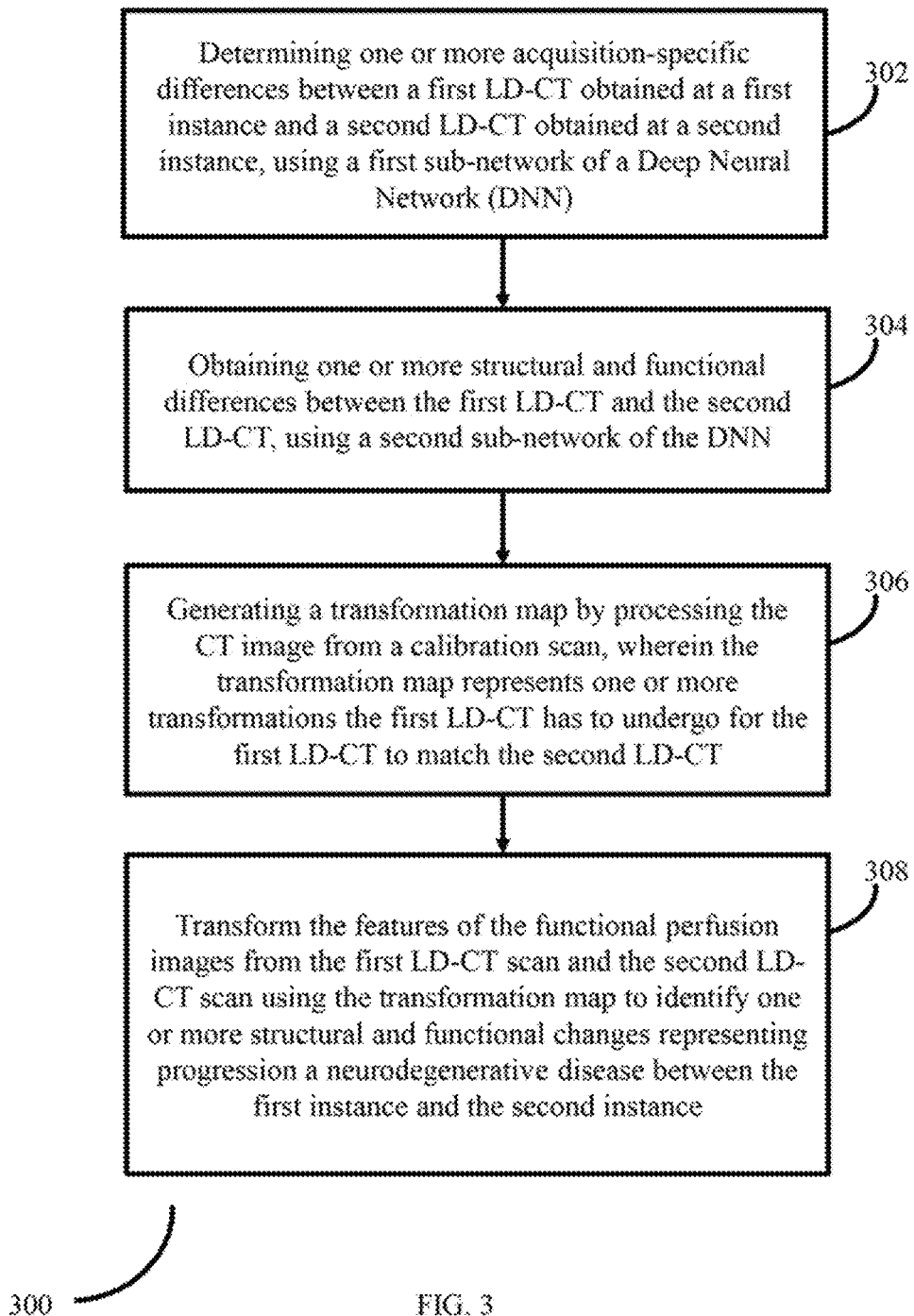
FIG. 3 is a flow diagram depicting steps involved in the process of determining progression of a neurogenerative disease, using the system of FIG. 1, in accordance with some embodiments of the present disclosure.

FIG. 3 is a flow diagram depicting steps involved in the process of determining progression of a neurogenerative disease, using the system of FIG. 1, in accordance with some embodiments of the present disclosure. The CT image reconstruction as in method 200 may be used for determining progression of a neurogenerative disease. The progression is determined based on health condition of a subject measured over a time period, i.e. based on CT scan images obtained at different time instances. At step 302 of a method 300 depicted in FIG. 3, the system 100 determines one or more acquisition-specific differences between a first Low Dose CT (LD-CT) obtained at a first instance and a second LD-CT obtained at a second instance, using a first sub-network of a Deep Neural Network (DNN). The acquisition-specific differences may refer to differences caused by change in equipment and other factors. For example, equipment from different manufacturers may have different characteristics, such as change in depth, saturation and so on. Such differences are referred to as acquisition-specific differences.

Further, at step 304 of the method 300, the system 100 obtains one or more structural and functional differences between the first LD-CT and the second LD-CT, using a second sub-network of the DNN. The structural and functional differences may refer to change in physical characteristics of the subject, for example, change in bone structure, tissue growth and so on. Further, at step 306 of the method 300, a transformation map is generated by processing the CT image from a calibration scan, wherein the transformation map represents one or more transformations the first LD-CT has to undergo for the first LD-CT to match the second LD-CT, i.e. essentially it captures differences between the first LD-CT and the second LD-CT. Further, at step 308, the system 100 transforms the features of a plurality of functional perfusion images from the first LD-CT scan and the second LD-CT scan using the transformation map to identify one or more structural and functional changes representing progression a neurodegenerative disease between the first instance and the second instance. The identified one or more structural and functional changes representing progression the neurodegenerative disease may be then provided as output to the user, using appropriate output means of the system 100. In various embodiments, steps in method 300 may be performed in the same order as depicted or in any alternate order that is technically feasible. In another embodiment, one or more steps in method 300 may be omitted.

Experiments and Results

The images and datasets used during the experiments are from the following sources. One dataset is from Ruogu Fang, Tsuhan Chen, Pina Sanelli: Towards Robust Deconvolution of Low-Dose Perfusion CT: Sparse Perfusion Deconvolution Using Online Dictionary Learning. Medical Image Analysis 17 (4): 417-428 (2013). This dataset is referred to as D1. Another dataset, called D2, is from a) Oskar Maier et al. ISLES 2015—A public evaluation benchmark for ischemic stroke lesion segmentation from multi-spectral MRI Medical Image Analysis, Available online 21 Jul. 2016, ISSN 1361-8415 http://dx.doi.org/10.1016/j.media.2016.07.009. Kistler et al., and b) The virtual skeleton database: an open access repository for biomedical research and collaboration. JMIR, 2013 http://doi.org//10.2196/jmir.2930.

During the experiments conducted, CBF maps generated by the system 100 were compared with three other reconstruction methods:—a) truncated singular value decomposition (TSVD), b) sparse perfusion deconvolution (SPD), and c) tensor total variation (TTV). To validate the usefulness of the joint estimation of the prior CT images and the CBF maps, the CBF maps generated by the system 100 were compared with CBF map generated with an MRF prior but with an independently reconstructed CT prior image. The latter approach is referred to as one-sided reconstruction. Two different datasets were used for validating the efficacy of the method 200 and the system 100: (i) D1:—a single subject in vivo data shared as part of the code for the SPD method, and (ii) D2:—data hosted as part of the ISLES challenge. Acquisition details of D1 included standard-dose acquisition at 190 mA and consists of 119 CT frames including 10 non-contrast enhanced frames. For both D1 and D2, CTP images were generated under different low-dose (LD) settings by generating the projection data from the SD-CT images, applying a scaled Poisson noise in the transform domain and then finally the LDCT images were reconstructed using filtered back-projection with a cosine filter. While efficacy of the system 100 was demonstrated on a low-dose data for D1 and D2, three different low-dose datasets called LD-1, LD-2 and LD-3 were generated.

Figure 4A:
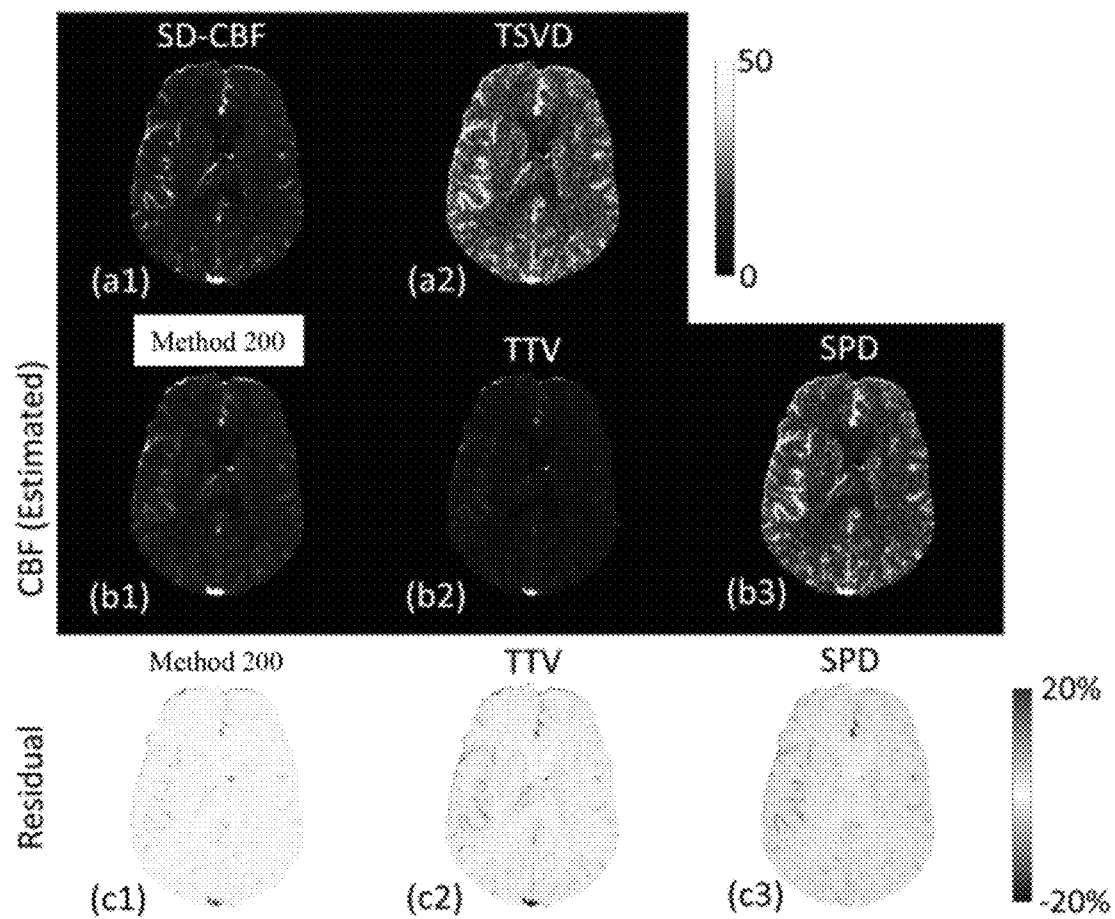
FIG. 4A depicts a first example of the reconstruction of the CT images, by the system of FIG. 1, in accordance with some embodiments of the present disclosure.

Results obtained during the experiments are depicted in FIGS. 4A through 4D. FIG. 4A depicts Qualitative evaluation on D1 with estimated CBF maps from different methods at low-dose level, where, (a1): CBF obtained using TSVD from SD-CT data, (a2): CBF obtained using TSVD from LD-CT data (PSNR 30.9 dB), (b1) to (b3): CBF obtained using the method 200 for (40.6 dB), TTV (37.4 dB), and SPD (34.1 dB), respectively, and (c1)-(c3) are relative error maps of row (b) with the SD-CBF map (a1).

Figure 4B:
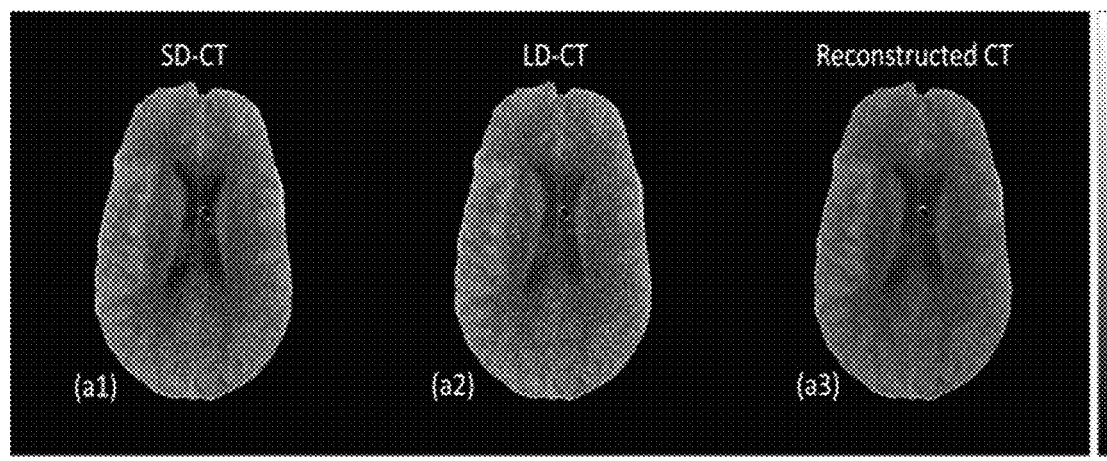
FIG. 4B depicts a second example of the reconstruction of the CT images, by the system of FIG. 1, in accordance with some embodiments of the present disclosure.
Figure 4C:
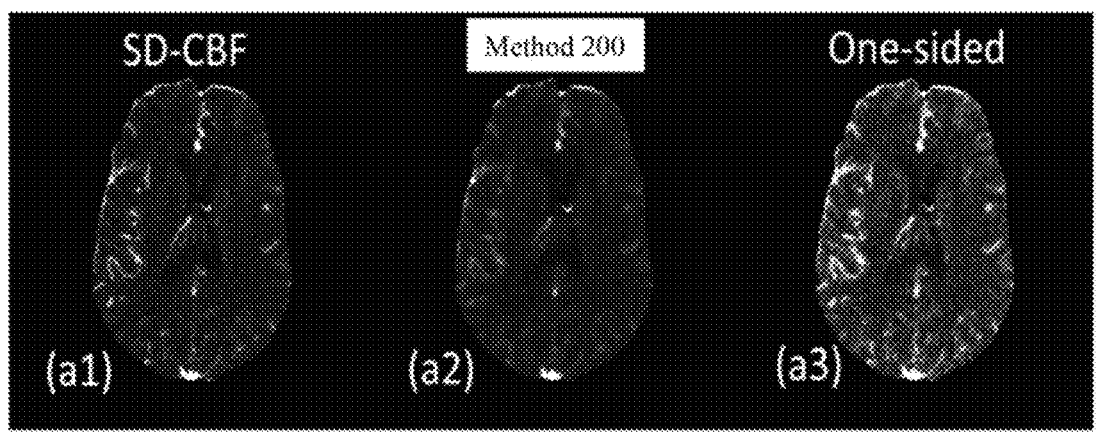
FIG. 4C depicts a third example of the reconstruction of the CT images, by the system of FIG. 1, in accordance with some embodiments of the present disclosure.
Figure 4D:
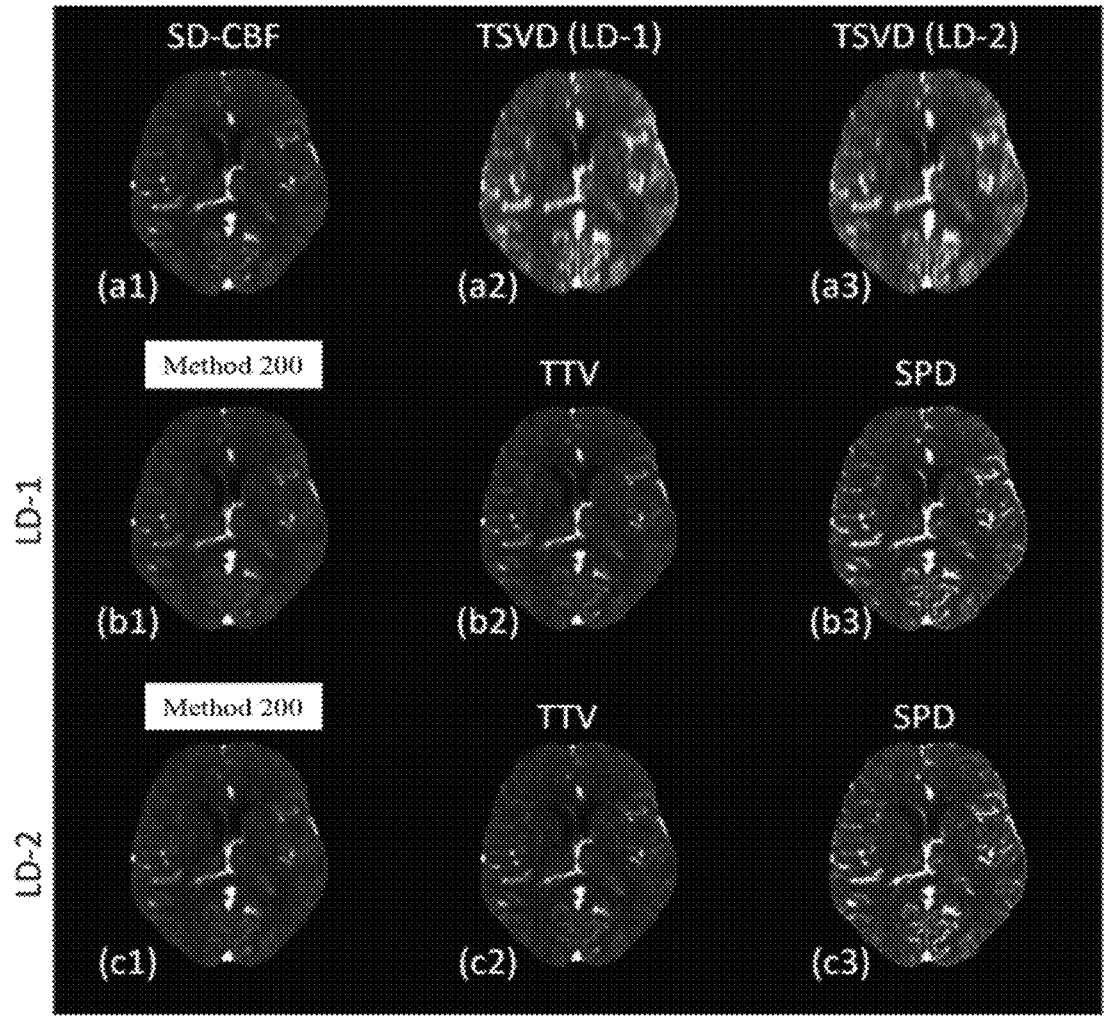
FIG. 4D depicts comparison of performance of the method 200 with other prior methods.

For the real data from D1 (FIG. 4A (a1)), the SD-CBF map obtained using TSVD on the SD-CTP data, seemed noisy (not smooth) perhaps due to the noise inherent across the dynamic SD-CT images. Additional post-reconstruction smoothing for the SD-CBF map wasn't performed. On low-dose data, TSVD-based deconvolution (FIG. 4A (a2)) by retaining 10% of the eigenvalues retains more noise compared (PSNR 26.4 dB with respect to the SD-CBF image) to other methods was observed. The sparse dictionary prior based SPD method removed most of the noise (FIG. 4A (b3)). TTV (FIG. 4A (b2)) enforced sparsity of the gradients across the spatial and temporal dimensions encouraging piecewise continuous results. Although TTV was found to be improving over SPD, a slight loss of contrast was observed compared to SPD and the method 200. On the other hand, reconstruction using a weighted MRF prior (FIG. 4A (b1)) represented fine-scale regularity, in the form of smoothness without much loss in contrast and was found to be closest to (PSNR 36.5 dB) the SD-CBF image. More importantly, the method 200 found to be having much smaller residue (FIG. 4A (c1)) compared to all other methods (FIG. 4A (c2)-(c3)). FIG. 4B compared the mean of the reconstructed CT prior image of the joint estimation task being done by the system 100 (FIG. 4B a(3)) with the mean of the prior images (first few frames of the dynamic sequence) from SD-CT (FIG. 4B a(1)) as well as the LD-CT data (FIG. 4B a(2)). The reconstructed CT obtained using the TV prior applied along all directions showed reduced noise and smoothly varying structures compared to the prior image using LD-CT image. Effect of these priors on the estimation of CBF maps were studied and is depicted in FIG. 4C. The one-sided reconstruction (FIG. 4C a(3)) used the prior image from the set of LD-CT images within the structural image weighted MRF prior. This image still contained much of the random noise and is not as smooth in structure and contrast in comparison to the method 200 (FIG. 4C a(2)). FIG. 4D depicts comparison of performance of the method 200 with other priors. For the dataset D2, results were obtained across different noise levels LD-1 and LD-2, using the method 200. The TSVD-based method produced noisy CBF maps as shown in FIG. 4D a(2) and FIG. 4D a(3) for LD-1 and LD-2 respectively. At LD-1, with relatively high SNR compared to LD-2 and LD-3, although both TTV (FIG. 4D b(2)) and the method 200 (FIG. 4D b(1)) improve over SPD, there is little difference in the image quality between TTV and the method 200. The results indicated that there is a quantitative improvement of "1 dB over the TTV in terms of PSNR. On the other hand, at LD-2, TTV (FIG. 4D c(2)) retains noise substantially higher than the method 200 and showed quantitatively less PSNR ("2.5 dB) than that of the method 200 (PSNR 40 dB).

Similarly, a quantitative evaluation was performed to assess performance of the method 200 and the TTV for three different dose levels LD-1, LD-2, and LD-3, across 25 subjects each having multiple 2D slices. Experimental results indicated that the method 200 outperformed the prior methods, and the TTV method was found to be closer to the method 200 for LD-1, whereas significant improvements were noticed for LD-2 and LD-3.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
acquiring, via one or more hardware processors, a plurality of frames from a low-dose X-ray computerized tomography (CT) perfusion scan of a subject;
identifying, via the one or more hardware processors, one or more contrast enhanced frames, from among the plurality of frames;
obtaining, via the one or more hardware processors, a plurality of tissue enhancement measurements (C) from the one or more contrast enhanced frames, wherein the plurality of tissue enhancement measurements (C) is obtained from the one or more contrast enhanced frames by using an equation $$C = C_a R \odot DV,\text{ and}$$

wherein $C_a$ is a block-circulant construction of an arterial input function (AIF), $D(\cdot)$ outputs a diagonal matrix with elements of V along corresponding diagonal, V is a perfusion map constructed from the one or more contrast enhanced frames, R represents an imaging system, and $\odot$ represents element-wise product;
modelling, via the one or more hardware processors, an optimization problem for joint estimation of a set of structural CT images and a perfusion map, based on the plurality of tissue enhancement measurements (C); and solving, via the one or more hardware processors, the optimization problem by determining an average structural prior image (Ü) and a functional image (V) with a 3D image-gradient-based prior and another patch-based prior with a fixed patch length, comprising, iteratively performing, till a calculated relative change in V is below a threshold:

reconstructing a pre-defined number of frames (M) of a structural image obtained using the 3D image-gradient-based prior and averaging the M frames to obtain the average structural prior image (Ü); and applying deconvolution term and the patch-based prior information with information from the average structural prior image (U), to obtain the functional image V.

2. The method of claim 1, wherein the optimization problem is modelled for the joint estimation of the set of structural CT images and the perfusion map, using an equation $$\arg\min_{U,V} D_U(U|Y) + \lambda_U \Phi(U) + D_V(V|C) + \lambda_V \Psi(V|U),$$

wherein $D_U(U|Y)$ represents data fidelity terms corresponding to reconstruction of the set of structural CT images, $D_V(V|C)$ represents data fidelity terms corresponding reconstruction of the perfusion map, $\Phi(U)$ represents one or more regularizes for the set of structural CT images, and $\Psi(V|U)$ represents one or more regularizes for the perfusion map.

3. The method of claim 1, wherein by modelling the optimization problem based on the set of structural CT images and the perfusion map, structural and functional variations representing one or more neurodegenerative diseases are identified.

4. The method as claimed in claim 1, wherein progression of a neurodegenerative disease over a period of time is determined by processing a first low-dose X-ray computerized tomography (LD-CT) obtained at a first instance and a second LD-CT obtained at a second instance, using a Deep Neural Network (DNN), comprises:

determining one or more acquisition-specific differences between the first LD-CT and the second LD-CT, using a first sub-network of the DNN;

determining one or more of the structural and functional differences between the first LD-CT and the second LD-CT, using a second sub-network of the DNN;

generating a transformation map by processing CT image from a calibration scan, wherein the transformation map represents one or more transformations the first LD-CT has to undergo for the first LD-CT to match the second LD-CT; and transforming the features of the functional perfusion images from the first LD-CT scan and the second LD-CT scan using the transformation map to identify one or more structural and functional changes representing the progression of the neurodegenerative disease between the first instance and the second instance.

5. A system, comprising:
one or more hardware processors;
a communication interface; and
a memory comprising a plurality of instructions, wherein the plurality of instruction when executed, cause the one or more hardware processors to:

acquire a plurality of frames from a low-dose X-ray computerized tomography (CT) perfusion scan of a subject;

identify one or more contrast enhanced frames, from among the plurality of frames;

obtain a plurality of tissue enhancement measurements (C) from the one or more contrast enhanced frames, wherein the plurality of tissue enhancement measurements (C) is obtained from the one or more contrast enhanced frames by using an equation $$C = C_a R \odot \mathcal{D}(V), \text{ and}$$

wherein $C_a$ is a block-circulant construction of an arterial input function (AIF), $\mathcal{D}(\cdot)$ outputs a diagonal matrix with elements of V along corresponding diagonal, V is a perfusion map constructed from the one or more contrast enhanced frames, R represents an imaging system, and $\odot$ represents element-wise product;

model an optimization problem for joint estimation of a set of structural CT images and a perfusion map, based on the plurality of tissue enhancement measurements (C); and solve the optimization problem by determining an average structural prior image (Ü) and a functional image (V) with a 3D image-gradient-based prior and another patch-based prior with a fixed patch length, by, iteratively performing, till a calculated relative change in V is below a threshold:

reconstructing a pre-defined number of frames (M) of a structural image obtained using the 3D image-gradient-based prior and averaging the M frames to obtain the average structural prior image (Ü); and applying deconvolution term and the patch-based prior information with information from the average structural prior image (Ü), to obtain the functional image V.

6. The system of claim 5, wherein the one or more hardware processors are configured to model the optimization problem for the joint estimation of the set of structural CT images and the perfusion map, using an equation $$\arg\min_{U,V} D_U(U|Y) + \lambda_U \Phi(U) + D_V(V|C) + \lambda_V \Psi(V|U),$$

wherein $D_U(U|Y)$ represents data fidelity terms corresponding to reconstruction of the set of structural CT images, $D_V(V|C)$ represents data fidelity terms corresponding reconstruction of the perfusion map, $\Phi(U)$ represents one or more regularizes for the set of structural CT images, and $\Psi(V|U)$ represents one or more regularizes for the perfusion map.

7. The system of claim 5, wherein the one or more hardware processors are configured to identify structural and functional variations representing one or more neurodegenerative diseases by modelling the optimization problem based on the set of structural CT images and the perfusion map.

8. The system of claim 5, wherein the one or more hardware processors are configured to determine progression of a neurodegenerative disease over a period of time by processing a first low-dose X-ray computerized tomography (LD-CT) obtained at a first instance and a second LD-CT obtained at a second instance, using a Deep Neural Network (DNN), by:

determining one or more acquisition-specific differences between the first LD-CT and the second LD-CT, using a first sub-network of the DNN;

determining one or more of the structural and functional differences between the first LD-CT and the second LD-CT, using a second sub-network of the DNN;

generating a transformation map by processing CT image from a calibration scan to determine one or more acquisition-specific differences and one or more of the structural and functional differences, wherein the transformation map represents one or more transformations the first LD-CT has to undergo for the first LD-CT to match the second LD-CT; and transforming the features of the functional perfusion images from the two scans using the transformation map to identify one or more structural and functional changes representing the progression of the neurodegenerative disease between the first instance and the second instance.

9. The one or more non-transitory machine-readable information storage mediums comprising one or more instructions which when executed by one or more hardware processors cause:

acquiring a plurality of frames from a low-dose X-ray computerized tomography (CT) perfusion scan of a subject;

identifying one or more contrast enhanced frames, from among the plurality of frames;

obtaining a plurality of tissue enhancement measurements (C) from the one or more contrast enhanced frames, wherein the plurality of tissue enhancement measurements (C) is obtained from the one or more contrast enhanced frames by using an equation:

$C = C_a R \odot DV$, and wherein $C_a$ is a block-circulant construction of an arterial input function (AIF), $D(\cdot)$ outputs a diagonal matrix with elements of V along corresponding diagonal, V is a perfusion map constructed from the one or more contrast enhanced frames, R represents an imaging system, and $\odot$ represents element-wise product;

modelling an optimization problem for joint estimation of a set of structural CT images and a perfusion map, based on the plurality of tissue enhancement measurements (C); and solving the optimization problem by determining an average structural prior image (U) and a functional image (V) with a 3D image-gradient-based prior and another patch-based prior with a fixed patch length, comprising, iteratively performing, till a calculated relative change in V is below a threshold:

reconstructing a pre-defined number of frames (M) of a structural image obtained using the 3D image-gradient-based prior and averaging the M frames to obtain the average structural prior image (U); and applying deconvolution term and the patch-based prior information with information from the average structural prior image (U), to obtain the functional image V.

10. The one or more non-transitory machine-readable information storage mediums as claimed in claim 9, wherein the optimization problem is modelled for the joint estimation of the set of structural CT images and the perfusion map, using an equation:

$$\arg\min_{U,\,V} D_U(U|Y) + \lambda_U \Phi(U) + D_V(V|C) + \lambda_V \Psi(V|U),$$

wherein $D_u(U|Y)$ represents data fidelity terms corresponding to reconstruction of the set of structural CT images, $D_v(V|C)$ represents data fidelity terms corresponding reconstruction of the perfusion map, $\Phi(U)$ represents one or more regularizes for the set of structural CT images, and $\psi(V|U)$ represents one or more regularizes for the perfusion map.

11. The one or more non-transitory machine-readable information storage mediums as claimed in claim 9, wherein by modelling the optimization problem based on the set of structural CT images and the perfusion map, structural and functional variations representing one or more neurodegenerative diseases are identified.

12. The one or more non-transitory machine-readable information storage mediums as claimed in claim 9, wherein progression of a neurodegenerative disease over a period of time is determined by processing a first low-dose X-ray computerized tomography (LD-CT) obtained at a first instance and a second LD-CT obtained at a second instance, using a Deep Neural Network (DNN), comprises:

determining one or more acquisition-specific differences between the first LD-CT and the second LD-CT, using a first sub-network of the DNN; determining one or more of the structural and functional differences between the first LD-CT and the second LD-CT, using a second sub-network of the DNN;

generating a transformation map by processing CT image from a calibration scan, wherein the transformation map represents one or more transformations the first LD-CT has to undergo for the first LD-CT to match the second LD-CT; and transforming the features of the functional perfusion images from the first LD-CT scan and the second LD-CT scan using the transformation map to identify one or more structural and functional changes representing the progression of the neurodegenerative disease between the first instance and the second instance.

* * * * *